Figure 1:
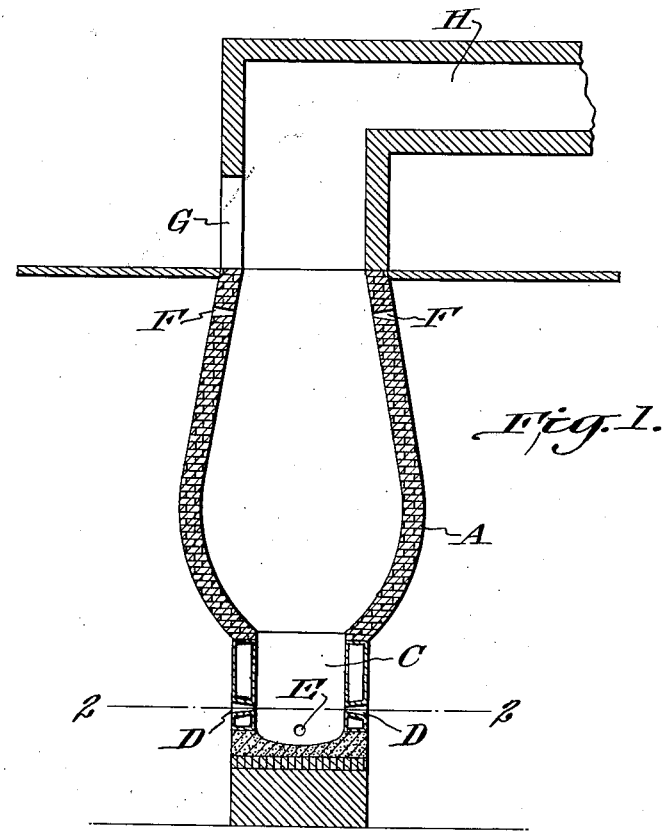

Patented May 20, 1930

1,759,559

UNITED STATES PATENT OFFICE

WOLFGANG JOB, OF BERLIN-DAHLEM, GERMANY, ASSIGNOR TO AMERICAN LURGI CORPORATION, OF NEW YORK, N, Y., A CORPORATION OF NEW YORK

BLAST FURNACE FOR REDUCTION AND RECOVERY OF VOLATILIZABLE METALS AS OXIDES AND METHOD OF OPERATING THE SAME

Application filed June 29, 1926, Serial No. 119,440, and in Germany July 2, 1925.

In the operation of shaft furnaces for recovering zinc, it has been found that with a given size of furnace a satisfactory de-zincing is obtained only if the quantity of the charge in a given unit of time is not permitted to increase above a certain quantity. The reason is this, that the de-zincing of a given mass of charge requires a definite time and intimate contact of each smallest particle of the charge with the reduction material under definite heat conditions. If one increases the addition of coke in order to give the particles of the charge an increased opportunity for contact during the period of reduction, then there results with materials which are rich in iron the disadvantage that the iron oxide (just as in a blast furnace) is more or less reduced, and forms in the hearth of the furnace deposits of metallic iron which very quickly increase and finally endanger the operation of the shaft furnace.

According to the present invention, these disadvantages are overcome by giving the shaft furnace a definite form and a corresponding mode of operation. Experience shows that the blast ascends along the walls of the furnace much quicker than in the middle portions of the charge, because of the smaller resistance that it will find. This has the consequence that the reaction between the charge to be reduced and the reduction material proceeds much more quickly in the neighborhood of a wall than in the middle portion of the charge; and therefore the slags produced in the neighborhood of the furnace walls contain a greater percentage of zinc than occurs in the middle portion of the furnace. This difficulty is met in this invention in this manner, that one enlarges or bellies out the furnace shaft above the hearth and contracts the walls at the hearth more than is usual. For example, in a shaft furnace of the height now usually employed, viz. about five meters, the width of the hearth is made less than 1 meter, as for example sixty-five centimeters, whereas the usual width for a furnace of this size is about 1.2 meters. Thereby on the one hand the gas and metal vapor stream is prevented from rising above the hearth in greater quantity along the walls than through the charge.

Under the influence of the vertically directed updraft, it will go more freely through the charge, particularly in that portion which lies inside of the bellied out portion, which improves the de-zincing. Simultaneously it is thereby prevented that deposits are formed on the colder furnace walls by deposition of substances such as sulfides, etc., as by the downwardly moving mass of the charge these products are carried again into the hot tuyère zone where by chemical reactions, the volatilizable metals therein are driven out.

On the other hand, the narrowing of the tuyère zone effects that the blast can penetrate more easily into the middle of the charge whereby it is compelled to rise more on the inside of the charge than along the wall.

A further improved mode of action of the furnace in connection with the narrowing at the tuyère level, consists in that one diminishes the size of the tuyère openings from that usually used. Usually the tuyère openings have an area of about 30 qcm. According to this invention, these openings are diminished to about ¼ or less of this area, whereby there results that the blast in the form of powerful pointed jets is forced into the furnace. This effects the result that on the one hand there is produced in the hearth so high a temperature that the "sows" or solid masses of iron, if formed in the hearth, will melt, and on the other hand so much oxygen is forced into this location that the melted iron is oxidized anew. This oxidized iron is then taken up by the slag bath and leaves the furnace unreduced.

In this manner the production of iron "sows" in the furnace hearth is prevented or any other accretions resulting from especially unfavorable conditions are gradually melted away, or at least their further increase beyond a certain moderate size is avoided.

The operation of de-zincing by a shaft furnace according to this invention may be still further improved by supplying additional air to the charge through tuyères located in the upper part of the furnace beneath the throat. This has the advantage that the charge is subjected to preliminary heating in the upper part of the furnace, and this preheating prolongs the effective reduction and vaporization zones. Even with the usual ores this operation produces a better de-zincing and a hotter charge less susceptible to the cooling of the new charge as it is fed into the furnace. Hotter gases give zinc pigments of better quality, while a too cold throat causes small masses of the unoxidized metal in the shape of dark dust which affects the color of the pigment. If one has, however, difficultly reducible ores, especially zinc silicates and zinc-containing slags, to smelt, the complete de-zincing is difficult to effect without this additional air, since the zinc silicate by the ordinary methods of smelting has to pass through only a short reduction zone and on this account does not have sufficient opportunity to give up completely its content of zinc, since zinc silicate slags form out of the free zinc oxide and the silica containing material, as long as both meet each other in the zone of sufficiently high temperature. As already in the upper portion of the shaft the temperature is increased by the addition of air at the beginning of the zinc reduction with resulting volatilization and oxidation, there can not result in the furnace a production of difficultly reducible zinc silicate. A hot blast may be used, if required, at both the upper and lower tuyères. This method of procedure has not only a desirable effect on the smelting of zinc ores, but is also of advantage with mixed ores which, with or without zinc, contain also lead or other volatilizable metals.

Figure 2:
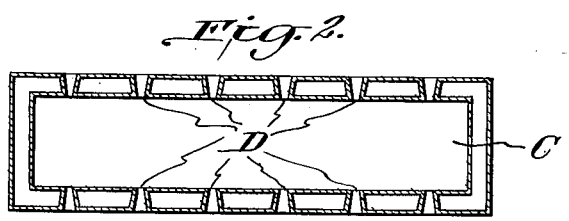

A furnace adapted to carry out the process is diagrammatically shown in the accompanying drawings in which Fig. 1 is a vertical section. and Fig. 2 is a horizontal section on plane 2—2 of Fig. 1.

A is the furnace shaft which is bellied out above the hearth C. D, D are lower tuyères, and E is the tap hole. F, F are the upper tuyères. G is the opening through which the charge is fed into the furnace, and H is the exit flue leading to the bag-house or other means for collecting the volatilized material.

It will be understood that the smelting is effected according to well known metallurgical practice in shaft furnaces of this type, the ore to be smelted being mixed with carbonaceous reducing material and fluxes, if necessary, and charged into the shaft furnace, where it is reduced and the resulting fumes oxidized.

I claim:

1. A furnace for the recovery of volatile metals in the form of oxides from ores containing volatilizable metals comprising a narrow rectangular tuyère zone and superposed thereon a shaft of rectangular section wherein said shaft is bellied out above said tuyère zone, the width of said tuyère zone is less than one-fifth of the height of the furnace, the inner tuyère openings are constricted to form pointed jets, and means for introducing additional air are provided in the upper part of the furnace beneath the throat.

2. Process of recovering volatile metals in the form of oxides from ores containing volatilizable metals by smelting in shaft furnaces which comprises causing substantially all of the hot smelting gases to pass upwardly through the central portion of the charge whereby the smelting of the charge in contact with the side walls is largely prevented, and supplying an additional air blast at the upper portion of the descending charge shortly after it enters the shaft of the furnace.

In testimony whereof, I affix my signature.

WOLFGANG JOB.